Dec. 21, 1926.                                                                1,611,653
J. E. LILIENFELD
RECTIFYING APPARATUS FOR ALTERNATING CURRENT
Filed March 27, 1926        2 Sheets-Sheet 1

INVENTOR
Julius Edgar Lilienfeld
BY
ATTORNEY

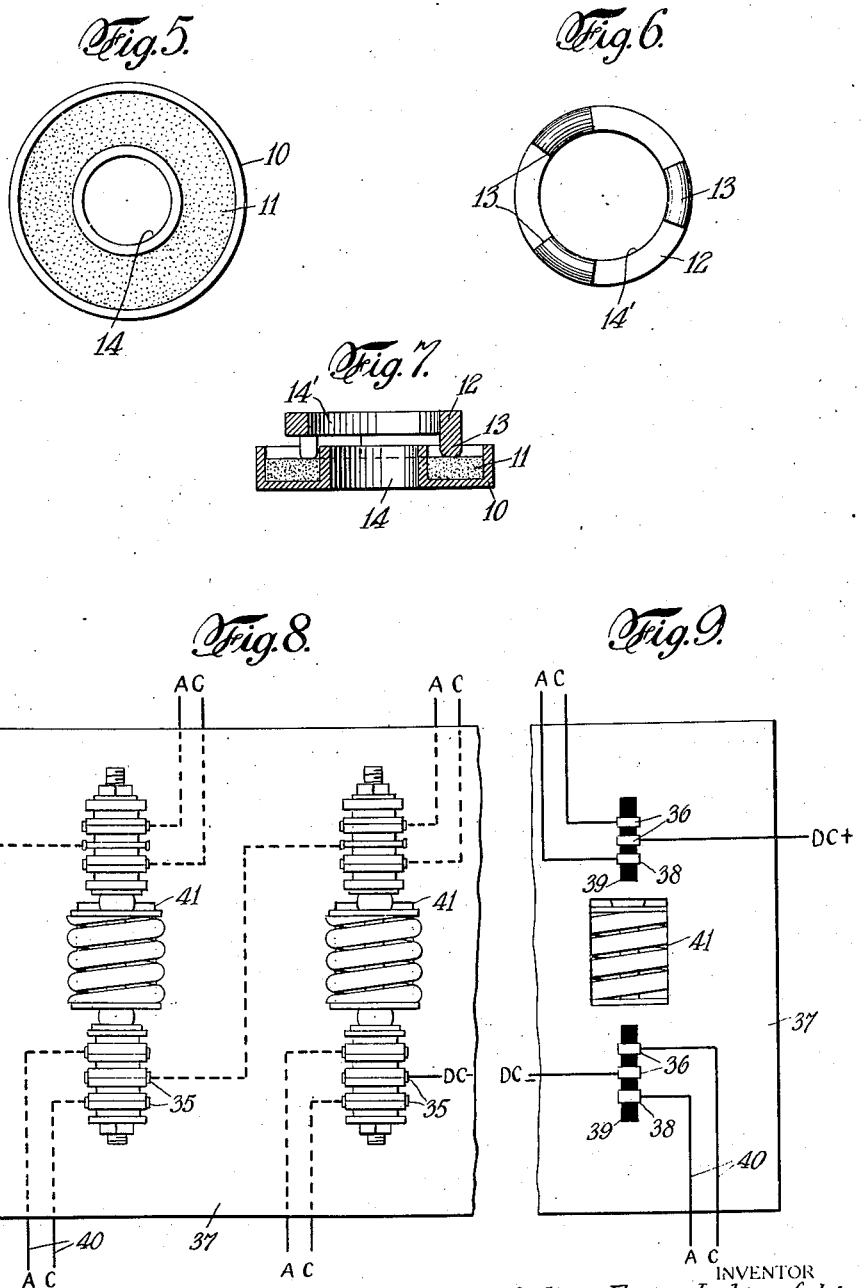

Patented Dec. 21, 1926.

1,611,653

UNITED STATES PATENT OFFICE.

JULIUS EDGAR LILIENFELD, OF BROOKLYN, NEW YORK.

RECTIFYING APPARATUS FOR ALTERNATING CURRENT.

Application filed March 27, 1926. Serial No. 97,849.

The invention relates to a rectifier member for rectifying alternating current; and more particularly to a rectifier of the dry cell type such as is set forth in U. S. Patent No. 830,924 to Pawlowski and No. 929,582 to Garretson and British patent to Brown No. 26,688 of 1905. In contradistinction to the solid compound plates used therein, the present invention contemplates the use of cells of which one electrode consists of a very finely-divided powder compound which is capable of being compacted or highly compressed, such as a powdered compound of copper and sulphur or other compound of an electro-positive and electro-negative element.

I have found that the disclosure of said patents is inadequate and that cells produced in accordance therewith do not operate satisfactorily, soon becoming erratic in action; and, apparently, no practical use has heretofore been made of such cells. I have found that this is partly due to the mechanical dificulty in producing a reliable contact between a solid compound plate and a metal and also due to the fact that decomposition of the compound occurs when the cells are operated under the conditions described. My observation is also confirmed in the case of copper sulfide compounds by the investigation of Dr. Baedeker who states in his papers (Ann. der Physik—1907, vol. 22, page 749) to the effect that the conductivity of these compounds is always to some extent, if not totally, of an electrolytic nature. In contradistinction, I find that under proper conditions the conductivity may be solely due to an electronic action and completely free of any electrolytic decomposition.

The novel construction herein set forth provides for a cell which affords most satisfactory operation. As a result of such construction, reliable and adequate contact is insured between the electrodes of a cell by employing as one of the electrodes the compacted or precompressed mass of the copper sulphur or like powder in place of a solid disk or plate; and further insuring the contact by the novel feature of maintaining thruout the life of the cell a pressure above the minimum required.

These considerations involve a novel mechanical construction both of cell and assembly of same into a battery, whereby a practical working device has been provided and as a result of which the cell or battery will remain effective over long periods of time.

In endeavoring to satisfy the aforesaid mechanical requirements, considerable difficulty was encountered due to the fact that the compressed powder electrode shrinks or sets during operation of the rectifier, more especially in the early life of same; and in accordance with the present invention provision is made to accommodate and compensate for such shrinkage in order that the pressure may range above that necessary for effective operation and thruout the life of the cell.

In view of the fact that, with a cell of commercially usable dimensions, the possible compressive force exerted between its electrodes is limited, it becomes necessary to reduce the active surfaces to such an extent that the force per unit area (pressure) applied therebetween will exceed the minimum value necessary for satisfactory operation. The novel construction set forth insures excess pressure which will be available and automatically applied as the shrinkage progresses; and involves the use of means such as a spring under a suitable initial compression and disposed in the novel manner set forth to maintain sufficiently high pressure to accommodate the shrinkage range thruout the life of the cell.

I have found for meeting the above conditions that the annular type of cell is by far the most satisfactory, one electrode of a cell acting as a holder in retaining between its walls the highly pre-compressed powder as a compacted and homogeneous mass which will not drop or spill out of its said holder. Moreover, in view of the requirement for an intense pressure and consequently relatively small contact area, the active surface of the electrode cooperating with the powder electrode will be limited to comparatively small dimensions; but as it is not permissible to employ a sharp-edged member for this purpose, in view of the cutting action of the same upon the powder mass, it has been found necessary to round off the contact edge to a semi-circular profile, for example, of a radius of not less than 1 to 2 millimeters. Such electrode would, therefore, have contact area considerably in excess of the active surface required and is best constructed as a ring with three projecting teeth, which is also most satisfactory from a mechanical standpoint both in affording stability of support and in transmitting the pressure exerted between the electrodes of the respective cells. It is further essential that uniform pressure be exerted thruout the entire pile or blocks of cells and this precludes the employment of insulating material in the assembly, the structure being so organized and arranged that no short-circuiting of individual cells will occur.

Aside from the aforesaid mechanical requirements it is desirable, for long life of a cell, that the same be operated at a voltage sufficiently low to eliminate any electrolytic action on the rectifying surfaces. In other words, the alternating voltage input and the direct voltage output must be so limited that an individual cell is not loaded to a degree at which this action may occur. I have found that no electrolytic action will be involved if a cell of this type be operated under impressed voltage approximating the theoretical ratio, for an ideal rectifier, of the direct current output to the alternating current input. This ratio for pure sine wave and impedance free circuit is, for half wave rectification, theoretically 0.64 and for full wave rectification 0.92. The direct current output voltage per cell when thus operated can safely be 1.6 volts, and perfectly satisfactory continuous operation is possible over long periods. With increase of reactance in the output circuit, the ratio of the input to output currents increases to unity.

The invention contemplates, also, a mounting for the novel cell assembly or battery, as well as a novel mounting for the rectifier unit as a whole.

The nature of the invention, however, will best be understood when described in connection with the accompanying drawings in which—

Fig. 5 is a plan view of one of the elements of a cell; and Fig. 6 is an underneath view of the other and cooperating element.

Fig. 7 is a vertical section thru a cell.

Fig. 8 is a fragmentary front elevation, and Fig. 9 is a fragmentary rear elevation indicating a convenient mounting for a rectifier unit composed of a plurality of the novel cells.

Figure 1:
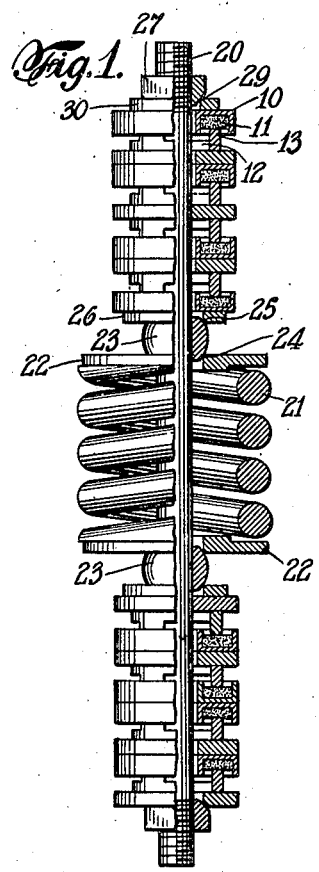
Fig. 1 is a vertical half section and elevation of a battery of the novel cells.
Figure 3:
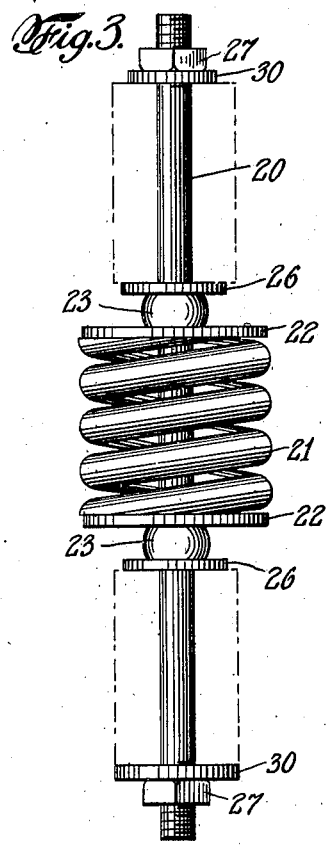
Fig. 3 is a skeleton view setting forth the cell retaining structure.
Figure 2:
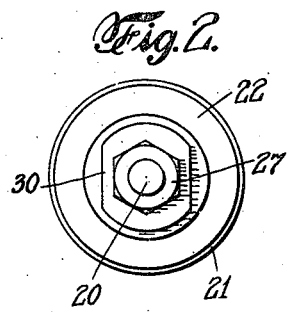
Fig. 2 is a plan thereof.
Figure 4:
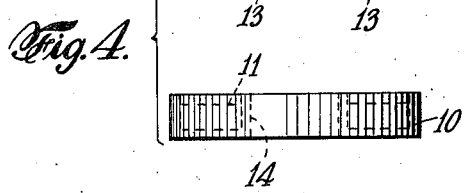
Fig. 4 shows in elevation the elements (separated) composing a single cell.

Referring to the drawings, 10 designates a container or holder for the one electrode 11 of the novel cell and 12 designates the other electrode thereof such as an aluminum ring with projections 13, said container and electrode 12 being hereinafter more fully described. With reference to the electrode 11 retained by the container 10, this is in the nature of a previously compressed powder, preferably a compound of copper sulphur which may be prepared by first providing a sheet of copper sulphur compound according to the methods disclosed in the said patent to Pawlowski and then grinding or milling the same to the desired degree of fineness. I prefer, however, to effect an intimate mixture of metallic copper powder with flowers of sulfur, the mixture being then heated to effect the chemical combination of the two elements. It is essential that no elemental sulfur be present in the copper sulfur compound powder; and to this end, particular care should be exercised in preparing the mixture to have the correct percentage of the components; or it may be refined in well-known manner by treatment with suitable solvents for the sulfur, such as ether, alcohol, carbon disulfide, etc.; or by heating, to remove any uncombined sulfur. The powder thus prepared is subjected to extremely high pressure, for example 1 metric ton per 100 square millimeters, in order that the same may be compacted into solid mass which, when fitted into its annular holder or cup 10, will not drop or spill out of the same.

It is to be understood, also, that while I have found the copper-sulfur powder to give the best results, other powder compounds of electro-positive and electro-negative elements such as the halogen compounds of metals (copper), also silver sulfide, molybdenum compounds, etc., may be utilized. Also, in place of the aluminum electrode, other sufficiently electro-positive metals such as magnesium, etc., may be made use of; but the particular combination of an oxidized aluminum electrode and copper sulfur compound electrode appears to afford the most satisfactory results.

As hereinbefore stated, a cell comprises the powder holder 10 with compacted powder 11 and the cooperating electro-positive metal element 12, the powder portion 11 of the cell being in the shape of an annulus fitting snugly within the circular walls of the holder 10 therefor so that said holder may be inverted without causing the powder to drop out from the same. This holder as stated is annular in form having a central opening 14; and similarly the element 12 is annular with central opening 14' of greater diameter than the opening 14 in amount sufficient to allow teeth 13 of its rim to contact with the powder portion 11 while clearing the body of the holder 10 which is composed of metal, for example brass. The teeth or projections 13 may conveniently be provided by forming same in the rim portion of the annular metal member 12; and the contacting edges of the respective projections are rounded, as indicated in Figs. 6 and 7, to a semi-circular profile, for example, of a radius of curvature of 1 to 2 millimeters in order that there may be no cutting action of such edges upon the powder mass. This would tend, otherwise, to disintegrate or loosen slightly said powder under the oscillations of the alternating current, resulting in unsteady output current and erratic operation of the rectifier cell, especially in view of the extreme pressure required between the electrodes of the cell. Furthermore, physical contact would become unbalanced and the effective contact action limited to a few points only, resulting in powder being placed out of contact at other portions of the rim.

As a rectifier unit, mechanically speaking, and of commercial size capable of delivering at least two amperes D. C. at three volts, two blocks of four cells—connected in an electrical parallelogram each—are required. The electrodes of such cells are then approximately of 21.5 millimeters outside diameter for the container 10 and of 17 millimeters outside diameter for the ring 12, while the inside diameter of said container is approximately 8 millimeters and the metal walls of the container may be of 1 millimeter thickness, so that an appreciable annular space is formed between the outer and inner walls of said container to receive the compacted powder 11 which is inserted therein under slight pressure. The ring 12 is of a thickness of from 2 to 4 millimeters, corresponding to the edge of its teeth 13, and of an inside diameter of 13 millimeters, so that when the openings of the two electrodes are brought into registry, the projections 13 of the ring will rest substantially mid-way between the walls of the container 10 upon the electrode 11 contained therein, as indicated in Fig. 7 of the drawings. It will be observed that in thus proportioning the two electrodes no short-circuiting of the same will occur so long as they are maintained in the aforesaid relative positions.

To insure this condition without the provision of insulating washers and the like, which would disturb the pressure distribution hereinafter more fully set forth, the individual cells may be arranged upon a rod 20 common thereto, for example, in groups or block of four cells and connected in accordance with the usual parallelogram system in manner hereinafter set forth. The two blocks of cells are maintained in separated positions at the respective ends of the rod and under the required pressure by suitable resilient means, which may consist of a helical spring 21 also mounted about the rod 20 substantially mid-way between the two blocks of cells. Spring 21 is held between two washers 22 loosely mounted upon the rod 20 which washers are centered, together with the block of cells, by sliding spacing beads 23 of spherical shape and fitting respective sockets 24 in the outer surface of the washers 22 and sockets 25 in washers 26 fitted over the rod, which latter washers bear against the inner ends of the respective blocks of cells. The blocks of cells thus superposed upon one another on the rod 20 are held in fixed position relatively thereto thru the aforesaid beads and washers by nuts 27 working on the threaded outer ends of the rod and having spherically formed bearing surfaces 28 at their inner faces which bear against sockets 29 in the outer surfaces of washers 30, the latter in turn bearing against the outermost cell of the respective groups of cells. The aforesaid construction, especially, thru the bearing arrangement including the beads 23, not only serves to space the electrode members of the respective cells with respect to the rod upon which they are mounted, but is utilized to transmit the requisite pressure from the spring 21 thereto. Electrical connection, moreover, is made thru the washers 25 and 30 and the beads 25 and nuts 27 between the two groups which are positioned on the rod such that the negative terminal of one group and the positive terminal of the other are connected thereto, thus placing the groups in series. The beads, washers and nuts are made of highly hardened steel and serve to suitably center and automatically retain the various parts in the desired relative position on the rod.

As hereinbefore stated, shrinkage of the compacted material 11 of one of the electrodes of the cell will occur; and under the considerable force applied, (not less than 500 lbs. for cells of the dimensions hereinbefore noted and having effective contact area of 40 to 50 square millimeters) will amount to some 1.5 millimeters during the normal life of two batteries of four cells each, as shown. To provide for this change in longitudinal dimension and accommodate or compensate automatically for the same, the spring 21 is given an initial compression such that a surplus force will be exerted thereby which is sufficiently in excess, of the minimum normal pressure required, to insure the taking up of the shrinkage over the necessary range, the pressure, of course, being correspondingly reduced but remaining always a sufficient amount above the minimum to afford satisfactory contact between the electrodes of the cells. For the unit of particular dimensions noted, I have found that an excess of from 300 to 500 lbs. above the 500 lbs. minimum force will be ample; and this force can conveniently be applied by correspondingly tightening up on the nuts 27. In the initial forming of the cells, however, it has been found necessary to start operation with a force of not more than 300 lbs., which force is gradually increased, with input voltage continuously applied, up to the maximum necessary to cover the range determined by the shrinkage—an output from the cells being had or not during this period, as may be desired.

In order conveniently to mount a unit of the character hereinbefore described and composed of two blocks of cells symmetrically disposed upon the rod upon either side of the pressure producing spring, the following provision has been made. Spring clips, in the nature of circular bands 35 open at the outer end and having reduced more or less circular eye portions 36 or extensions at the inner end, are locked to a suitable panel 37 as by passing the inner ends 36 thru corresponding slots 38 in the panel and then locking the number of clips together at the back of the panel by passing thru the eyes of the corresponding inner ends 36 a rod or bar 39 of insulating material and of sufficient thickness to wedge or draw said ends against the back of the panel. This locks the respective clips together and holds them to the panel with the open semi-circular forward portions 35 projecting from the front face and shaped to receive and make contact with peripheries of the various cells which may be snapped therein and held thereby under the tension of the forwardly directed arms of said clips. The spacing of the various clips on the panel is such that the desired connections are made to the proper cells or electrodes thereof; and conductors 40 may be soldered to the ends 36 for suitably interconnecting the respective cells. Furthermore, the panel may be cut away as at the recesses or openings 41 to accommodate the spring 21 of a unit and permit the blocks of cells to rest substantially against the outer face of the panel. Fitting thus the spring within the opening 41 insures at the same time against longitudinal displacement of the rectifier unit as a whole so that proper contact between the respective cells and clips will be maintained.

I claim:—

1. A dry cell rectifier for alternating current, comprising an electrode of a highly compressed and conducting powder compound of an electro-positive and an electro-negative element.

2. A dry cell rectifier for alternating current, comprising an electrode of powdered copper sulfur compound.

3. A dry cell rectifier for alternating current, comprising an electrode of powdered copper sulfur compound free from elemental sulfur.

4. A dry cell rectifier for alternating current, comprising an electrode of aluminum and an electrode of compressed powdered copper sulfur compound free from elemental sulfur.

5. A dry cell rectifier for alternating current, comprising an annular metal electrode, and an annular metal container retaining a highly compressed powdered compound of an electro-positive and an electro-negative element whose surface is in contact with the metal electrode.

6. A dry cell rectifier for alternating current, comprising an annular container and a highly compressed powder compound of an electro-positive and an electro-negative element held therein, and a metal electrode cooperating therewith having contact projections with rounded edge.

7. A dry cell rectifier for alternating current, comprising an annular metal container and an electrode of a highly compressed and powdered compound of copper and sulfur held therein, a metal electrode cooperating therewith thru projections bearing upon the surface of the powder compound and whose bearing edges are rounded to a substantially semi-circular profile of a radius of curvature of from 1 to 2 millimeters, and means to exert an intense pressure between the said electrodes.

8. A dry cell rectifier for alternating current, comprising an annular metal container and a highly compressed powder compound held therein, an annular metal electrode cooperating therewith thru projections bearing upon the surface of the powder compound, and means to retain the metal electrode and the metal container for the powder in a predetermined spaced relationship to prevent metallic contact therebetween and short-circuiting of the cell.

9. A dry cell rectifier for alternating current, comprising an electrode of a conducting powder compound of an electro-positive and an electro-negative element, a metal electrode cooperating therewith, and means to exert an intense pressure thereon.

10. A dry cell rectifier for alternating current, comprising an electrode of powdered copper sulfur compound, an aluminum electrode cooperating therewith, and means to exert a pressure thereon in excess of four kilograms per square millimeter.

11. A dry cell rectifier for alternating current, comprising an electrode of a conducting powder compound of an electro-positive and an electro-negative element, a metal electrode cooperating therewith, and resilient means to exert and maintain thruout the life of the cell a pressure thereon in excess of the minimum necessary for satisfactory operation.

12. A rectifier unit for alternating current, comprising two blocks of dry cell rectifier cells, and an interposed spring exerting a pressure thereon in a direction to separate the respective blocks.

13. A rectifier unit for alternating current, comprising two blocks of dry rectifier cells, and an interposed spring exerting a pressure thereon in a direction to separate the respective blocks, and means to adjust the degree of pressure.

14. A rectifier unit for alternating current, comprising a supporting rod, two blocks of dry rectifier cells mounted about the opposite ends thereof, and a helical spring mounted about said rod between the said blocks of cells and bearing against both blocks.

15. A rectifier unit for alternating current, comprising a supporting rod threaded at its ends, two blocks of dry rectifier cells mounted about the opposite ends thereof, a helical spring mounted about said rod between the side blocks of cells and bearing against both blocks, and nuts working over the ends of said rod to adjust the degree of compression of said spring.

16. A rectifier unit for alternating current, comprising a metallic supporting rod, blocks of dry rectifier cells mounted thereon, and means for holding the cells in spaced relation to the rod and providing an air core therebetween, the blocks of cells being electrically connected to each other through the rod and each cell having openings to the atmosphere and in communication with the said air core.

17. A rectifier unit for alternating current, comprising a metallic supporting member, and two blocks of dry rectifier cells mounted thereon, each block consisting of four cells connected in an electrical parallelogram, and the direct current outputs of the two parallelograms being connected in series thru said metallic supporting member.

18. A rectifier unit for alternating current, comprising a metallic rod threaded at its ends, a helical spring mounted about said rod substantially midway of its ends, washers fitting about the respective ends of the spring and having sockets in their respective outer faces, centering beads of spherical shape slidable upon the rod and fitting the respective sockets of the said washers, two pairs of washers mounted upon said rod, two blocks of dry rectifier cells held between the respective pairs of last-named washers, the inner washers of each pair having sockets in their faces for cooperating with the said beads and the outer washers of each pair being also provided with sockets in their respective outer faces, and nuts working over the threaded ends of said rod and spherically formed to fit at their inner ends the corresponding sockets of the outer of the holding washers, whereby the spring may be compressed to the desired degree to afford the requisite force upon the electrodes or the said cells.

19. The combination with a rectifier unit embodying a supporting rod, and a plurality of dry rectifier cells mounted thereon; of a panel of insulation material, and spring contact clips secured to the panel to receive and hold the respective cells of the unit.

20. The combination with a rectifier unit embodying a supporting rod, two blocks of dry rectifier cells mounted thereon, and an interposed spring for exerting the requisite force upon the electrodes of said cells; of a panel of insulation material having a slot to accommodate partly the spring of said unit and slits in the panel upon either side of the said spring slot, spring contact clips passing thru said slits and having arms extending from the face of the panel to receive and make contact with the respective cells of the two blocks, and insulation members fitting the rearwardly protruding ends of the clips to secure the latter to the panel.

21. The method of preparing dry rectifier cells, which consists in electrically forming the same by applying initially a contact pressure between the electrodes below the minimum for normal satisfactory operation, then subjecting the same to the electric current, and increasing the pressure upon the electrodes gradually to an amount considerably in excess of said minimum.

In testimony whereof I affix my signature.

JULIUS EDGAR LILIENFELD.